United States Patent
Beyer et al.

[11] Patent Number: 5,249,852
[45] Date of Patent: Oct. 5, 1993

[54] ANTI-LOCKING CONTROL SYSTEM

[75] Inventors: Claus Beyer, Schwieberdingen; Peter Dominke, Bietigheim-Bissingen; Eberhard Sonntag, Stuttgart, all of Fed. Rep. of Germany

[73] Assignee: Robert Bosch GmbH, Stuttgart, Fed. Rep. of Germany

[21] Appl. No.: 691,015
[22] PCT Filed: Nov. 16, 1989
[86] PCT No.: PCT/EP89/01377
  § 371 Date: Jun. 14, 1991
  § 102(e) Date: Jun. 14, 1991
[87] PCT Pub. No.: WO90/06869
  PCT Pub. Date: Jun. 28, 1990

[30] Foreign Application Priority Data

Dec. 14, 1988 [DE] Fed. Rep. of Germany ....... 3841977

[51] Int. Cl.$^5$ .................................................. B60T 8/00
[52] U.S. Cl. .................... 303/108; 303/103; 303/107; 364/426.02
[58] Field of Search ............... 303/103, 107–109, 303/93, 100; 364/426.02

[56] References Cited

U.S. PATENT DOCUMENTS

| | | | |
|---|---|---|---|
| 4,054,328 | 10/1977 | Leiber et al. ........................ 303/103 |
| 4,485,445 | 11/1984 | Braschel ........................ 364/426.02 |
| 4,718,735 | 1/1988 | Ogino ........................ 303/93 |
| 4,729,608 | 3/1988 | Fennel et al. ........................ 303/109 X |
| 4,790,607 | 12/1988 | Atkins ........................ 303/109 |
| 4,809,183 | 2/1989 | Eckert ........................ 364/426.02 X |
| 4,901,239 | 2/1990 | Yoshino ........................ 364/426.02 |
| 4,921,314 | 5/1990 | Braschel et al. ............... 303/109 X |
| 4,929,034 | 5/1990 | Braschel et al. ........... 364/426.02 X |
| 4,985,839 | 1/1991 | Dominke ........................ 303/103 X |

Primary Examiner—Robert J. Oberleitner
Assistant Examiner—Josie A. Ballato
Attorney, Agent, or Firm—Felfe & Lynch

[57] ABSTRACT

An anti-lock brake system is described in which, when an instability limit IS is exceeded by an instability criterion K $$K = aB + b \cdot L + cIL + d\dot{V}_F$$

(where a, b, c and d are constants and B is the relative wheel deceleration, L is the wheel slip and IL is the integral of the wheel slip and $\dot{V}_F$ is the calculated vehicle deceleration, a pressure reduction pulse is produced, the width of which depends on the reduction time in the preceding cycle. This pulse also resets the integrator and the differentiator required for obtaining the wheel deceleration to 0. Between the pressure reduction pulses, pressure is held constant.

14 Claims, 1 Drawing Sheet

ANTI-LOCKING CONTROL SYSTEM

BACKGROUND OF THE INVENTION

German Offenlegungsschrift 3,614,770 discloses an anti-lock brake system in which the wheel deceleration and the wheel slip are integrated for a predetermined time and the results of integration summed. If the sum exceeds a limit, a pressure reduction pulse is produced and the results of integration are at least partially erased; preferably, a predetermined number of measured values are integrated, the measured value already taken into consideration the longest being oxcluded upon taking into consideration a new measured value (time window).

SUMMARY OF THE INVENTION

The design of the anti-lock controller creates a convenient controller which reacts rapidly to corresponding driving states.

DETAILED DESCRIPTION OF THE PREFERRED EMBODIMENT

Figure 1:
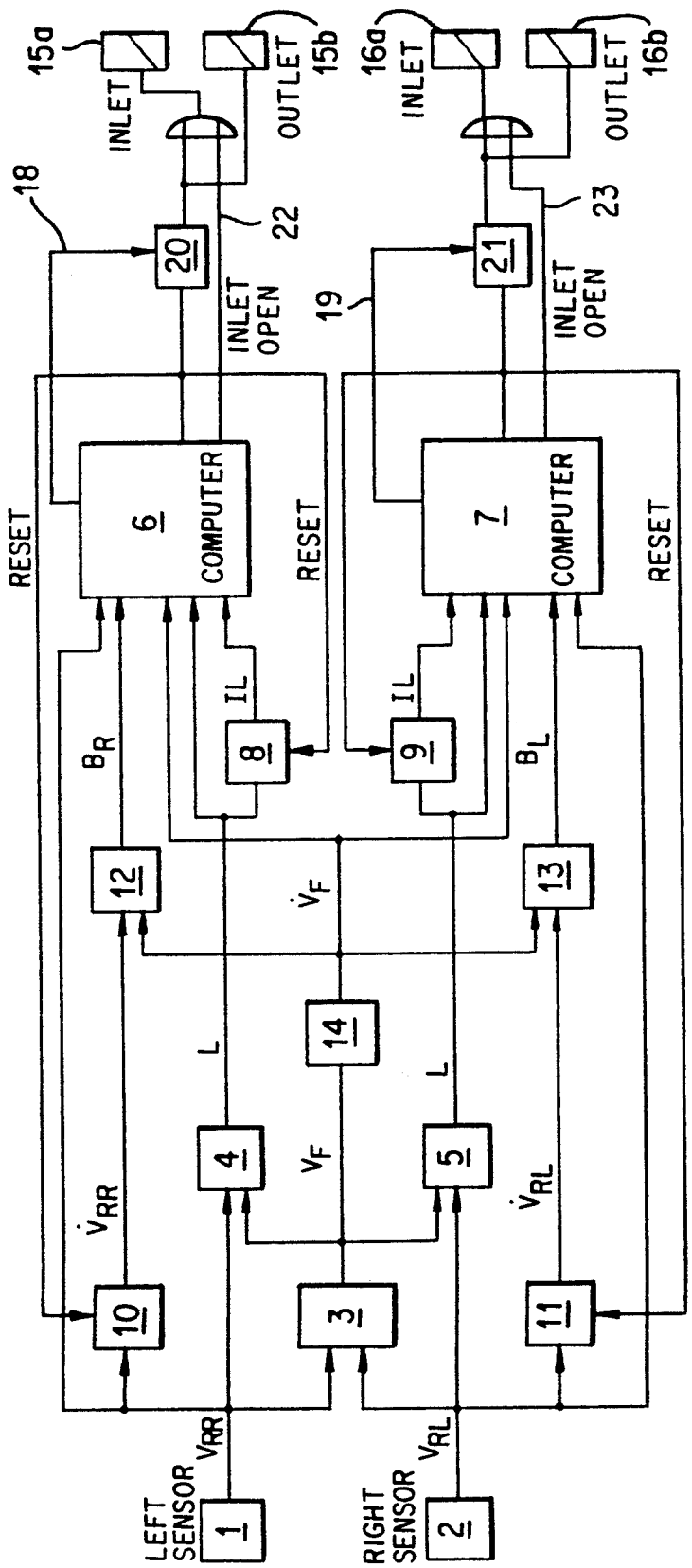
FIG. 1 shows a block diagram of the controller.

In FIG. 1, wheel-speed sensors 1 and 2 are assigned to the non-driven wheels. From the speed values of these sensors 1 and 2, a speed characteristic approximated to the vehicle speed $V_P$ is produced in a block 3. Blocks 4 and 5, to which both the wheel-speed signals $V_R$ and the vehicle-speed signal $V_F$ are fed, each emit an output signal which corresponds to the slip L of the wheel. These signals are fed to computers 6 and 7, but also to integrators 8 and 9 which integrate the slip signal supplied and likewise feed the integration signal IL to the computers 6 and 7 respectively.

In differentiating elements 10 and 11, the wheel-speed signals $V_{RR}$ and $V_{KL}$ from sensors 1 and 2 are differentiated; the output signals are then fed to subtractors 12 and 13, to which the calculated vehicle deceleration $\dot{V}_F$, from differentiatior 14 is also fed. In blocks 12 and 13, the relative wheel deceleration $B = \dot{V}_R - \dot{V}_F$ for both wheels are formed and likewise fed to the computers 6 and 7 respectively. The computers 6 and 7 respectively produce for the wheel assigned to them the sum $aB + bL + cIL + d\dot{V}_F$, a, b, c and d being weighting constants. If the instability criterion K exceeds an instability limit IS, a pressure reduction pulse is produced at the output of the computer 6 or 7, which pulse is fed to the valves assigned to the wheels (inlet valves 15a or 16a and outlet valves 15b or 16b) for the purpose of pressure reduction (both valves 15a and 15b or 16a and 16b are activated).

The pressure reduction pulse is also used to reset the integrating elements 8 or 9 and differentiating elements 10 or 11 to zero. Between the pressure reduction pulses, the pressure is held constant.

The width of the first pressure reduction pulse in a cycle is dimensioned so that is corresponds to a certain proportion of the sum ABZ of the pressure reduction times of the preceding cycle. The subsequent pulses represent a fraction of the first pulse; dimensioning is effected by the computers 6 and 7 respectively. In order to achieve a linearisation of the pressure reduction times, the sum of the pressure reduction times ABZ is converted in the computer 6 and 7, respectively, into an equivalent activation time ABZ* in accordance with the relationship $ABZ^* = ABZ(1 - e^{t/T})$. Here, t is the activation time of the outlet valve and T is a time constant matched to the hydraulics.

The computers 6 and 7 also determine in a known manner the instant at which, before reaching the maximum slip, the wheel speed reaches its turning cusp point (=cusp point of the wheel deceleration) and now changes the instability relationship in such a way that this is determined more by the wheel deceleration and less by the slip components. The relationship can, for example, be $K = B + L + IL/2$. As soon as, by comparison of successive measured values of the wheel speed, the computer detects the tendency to an increase in wheel speed, it outputs a signal via a line 18 or 19 to a block 20 or 21 which then interrupts the activation of both outlet valves 15b and 16b (pressure reduction). However, via line 22 or 23, the inlet valve 15a or 16a remains activated (holding constant).

The computer 6 or 7 preferably dimensions the length of the first pulse in the first control cycle in proportion to the wheel deceleration and in inverse proportion to the vehicle deceleration.

Figure 2:
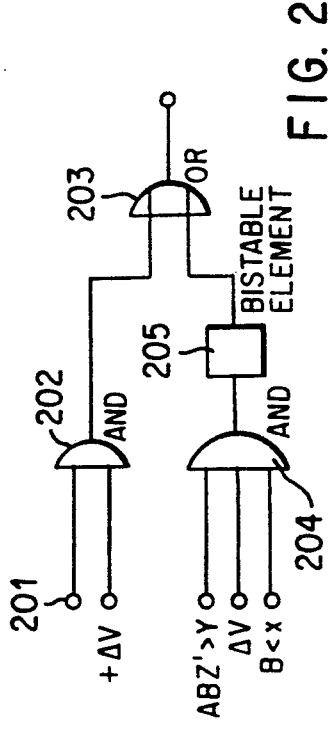
FIG. 2 shows details of the controller.

Under certain conditions, a prolongation of pressure reduction is performed until the occurrence of a certain relative wheel acceleration +B. More specifically, a prolongation is performed when, despite a tendency to an increase in wheel speed, the differentiator 10 or 11 still outputs a deceleration value, i.e. when the differentiator does not follow. This condition can also be made dependent on whether the already accumulated pressure reduction time ABZ' exceeds a certain value. An implementation of this condition is shown in FIG. 2. According to the circuit of FIG. 2, the prolongation of pressure reduction is contained in block 20 or 21. The reduction signal is fed to the AND element 202 via the terminal 201. It passes via an OR element 203 to the valves 15 or 16 until the signal $+\Delta v$ (tendency to an increase in speed) occurs.

In the special case that, despite the tendency to an increase in speed ($+\Delta v$ present), a (small) wheel deceleration ($B < -X$) is still detected and pressure has already been reduced for at least a predetermined time (ABZ'>y), an AND element 204 produces a signal which sets a bistable element 205. This then outputs a pressure reduction signal to the OR element 203. If a +B signal occurs, it resets the bistable element 205 again.

Following a pressure reduction, the pressure is held constant until a limit ST is exceeded by a stability criterion $K_{st} = e \cdot B^* + fL$. Here, B* is the relative wheel acceleration $B^* = V_R - V_F$, L is the (negative) slip and e and f are constants.

The pressure reduction is preferably effected in a pulsed fashion, initially with a large gradient and then with a reduced gradient. The period of time after which a changeover is effected to the reduced gradient is preferably made dependent on the length of the preceding pressure reduction and, in addition, on the ratio of the pressure build-up time to the pressure reduction time in the preceding cycle. The pressure build-up pulses on the line 22 or 23 are dimensioned by the controller 6 or 7.

If a very high wheel acceleration occurs, a pressure build-up pulse is produced which feeds in the previously present brake pressure again.

We claim:

1. Antilock brake system for a vehicle having wheels, said system comprising
   valve means including an outlet valve for regulating brake pressure at at least one wheel in control cycles, each cycle being characterized by a sum ABZ of pressure reduction times,
   means for (1, 2) for determining speed $V_R$ of said at least one wheel,
   means (10, 11) for differentiating the speed $V_R$ to produce a deceleration $\dot{V}_R$ of said at least one wheel,
   means (3) for determining the vehicle speed $V_F$,
   means (14) for determining the vehicle deceleration $\dot{V}_F$ from the vehicle speed $V_F$,
   means (4, 5) for determining the wheel slip L of said at least one wheel from the wheel speed $V_R$ of said at least one wheel and the vehicle speed $V_F$,
   means (8, 9) for integrating the slip L to produce an integral IL for said at least one wheel,
   means (12, 13) for determining the relative wheel acceleration $B = \dot{V}_R - \dot{V}_F$ for said at least one wheel,
   means (6, 7) for forming an instability criterion $K = aB + bL + cIL + d\dot{V}_F$, where a, b, c, and d are constants,
   means (6, 7) for comparing K to an instability limit IS and, when K > IS, producing a first pressure reduction pulse of a duration dependent upon the sum ABZ of reduction times in the preceding cycle, resetting the means (8, 9) for integrating the slip, and resetting the means (10, 11) for differentiating the wheel speed, said pulse acting on said valve means to reduce brake pressure at said at least one wheel, whereupon said valve means are controlled so that the brake pressure remains constant.

2. Anti-lock brake system according to claim 1, characterized in that the duration of the first pressure reduction pulse in one cycle corresponds to a substantial fraction of the sum ABZ of the pressure reduction times of the preceding cycle and in that subsequent pressure reduction pulses are produced following said first pressure reduction pulse in said cycle, said subsequent pulses having a duration which is a fraction of the duration of the first pulse.

3. Anti-lock brake system according to claim 1, characterized in that the sum of the pressure reduction times ABZ of the preceding cycle is converted before producing the first pressure reduction pulse in accordance with the equation $$ABZ^* = ABZ(1 - e^{t/T})$$

where t is the activation time of the outlet valve and T is a time constant matched to the hydraulics.

4. Anti-lock brake system according to claim 1 wherein when a turning cusp point of the wheel speed is reached before a maximum slip value is reached, the instability criterion K is altered to depend more on the wheel deceleration B than components L, IL, and $\dot{V}_F$.

5. Anti-lock brake system according to claim 1 wherein the pressure reduction is interrupted as soon as a tendency to an increase in the wheel speed is detected.

6. Anti-lock brake system according to claim 1 wherein the duration of the first reduction pulse of the first control cycle is proportional to a wheel deceleration and inversely proportional to the vehicle deceleration.

7. Anti-lock brake system according to claim 1 wherein, characterised in that a pressure reduction is carried out until a positive threshold of the wheel acceleration B is reached if, despite the detection of a tendency to an increase in the wheel speed, the wheel acceleration still falls below a predetermined value.

8. Anti-lock brake system according to claim 7, characterised in that the prolongation of pressure reduction is only operative if the pressure reduction time has exceeded a predetermined duration.

9. Anti-lock brake system as in claim 1 wherein the pressure is held constant after being reduced and a stability limit ST is predetermined, to which is compared the stability criterion $K_{ST}$ which is formed according to the relationship $$K_{ST} = eB^* + fL$$

where e and f are constants, $B^*$ is the relative wheel acceleration and L is the negative brake slip, and wherein a pressure build-up is triggered if the stability limit ST is exceeded.

10. Anti-lock brake system according to claim 9, characterised in that the pressure build-up is effected in a pulsed fashion.

11. Anti-lock brake system according to claim 10, characterised in that, at the beginning of the brake-pressure build-up, an increase in the brake pressure is effected with a gradient for a period of time and, after this, with a smaller gradient, the period of time being dependent on the length of the directly preceding pressure reduction, and in that the period of time is, in addition, dependent on the ratio of the pressure build-up time to the pressure reduction time in the preceding control cycle.

12. Anti-lock brake system according to claim 11, characterised in that the period of time in the first control cycle is dependent on the preceding pressure reduction time.

13. Antilock brake system as in claim 1 wherein said vehicle has driven wheels and non-driven wheels, said means for determining speed $V_R$ determining the speed of the non-driven wheels.

14. Antilock brake system as in claim 13 wherein the vehicle speed $V_F$ is determined from the speeds of the non-driven wheels.

* * * * *

UNITED STATES PATENT AND TRADEMARK OFFICE
CERTIFICATE OF CORRECTION

PATENT NO. : 5,249,852
DATED : October 5, 1993
INVENTOR(S) : Beyer et al.

It is certified that error appears in the above-indentified patent and that said Letters Patent is hereby corrected as shown below:

Column 1, line 48: Change "$d\dot{V}F$" to --$d\dot{V}_F$--;

Column 2, line 53: Change "$V_R - V_F$" to --$\dot{V}_R - \dot{V}_F$--.

Signed and Sealed this

Twentieth Day of September, 1994

Attest:

BRUCE LEHMAN

Attesting Officer

Commissioner of Patents and Trademarks